United States Patent [19]
Schauder et al.

[11] Patent Number: 5,889,668
[45] Date of Patent: Mar. 30, 1999

[54] THREE-PHASE DC-TO-AC POWER INVERTER WITH THREE-LEVEL POLES

[75] Inventors: Colin David Schauder, Murrysville, Pa.; Scott Lawrence Williams, Voorhees, N.J.

[73] Assignee: Electric Power Research Institute, Inc., Palo Alto, Calif.

[21] Appl. No.: 924,392

[22] Filed: Sep. 5, 1997

[51] Int. Cl.[6] .............................. H02M 5/45; H02M 3/24; H02M 7/521; G05F 1/70
[52] U.S. Cl. .............................. 363/137; 363/37; 363/96; 323/207
[58] Field of Search .................................. 363/34, 37, 43, 363/96, 135, 136, 137; 323/207

[56] References Cited

U.S. PATENT DOCUMENTS

| | | | |
|---|---|---|---|
| 4,467,407 | 8/1984 | Asano et al. | 363/43 |
| 4,855,893 | 8/1989 | Kratz | 363/136 |
| 4,881,159 | 11/1989 | Holtz et al. | 363/137 |
| 5,343,139 | 8/1994 | Gyugyi et al. | 323/207 |
| 5,375,050 | 12/1994 | Nakata et al. | 363/136 |
| 5,459,655 | 10/1995 | Mori et al. | 363/132 |
| 5,576,944 | 11/1996 | Uchino | 363/96 |
| 5,642,275 | 6/1997 | Peng et al. | 363/137 |
| 5,731,970 | 3/1998 | Mori et al. | 363/132 |

*Primary Examiner*—Peter S. Wong
*Assistant Examiner*—Bao Q. Vu
*Attorney, Agent, or Firm*—Richard V. Westerhoff; Eckert Seamans Cherin & Mellott, LLC

[57] ABSTRACT

A three-phase dc to-ac power inverter includes a dc power source with a first dc node for positive voltage, a second dc node for negative voltage, and a third dc node for zero voltage. A set of three-level pole circuits are connected to the first dc node, the second dc node, and the third dc node of the dc power source. A control circuit, responsive to an inverter voltage vector reference demand signal with a voltage magnitude reference demand component and a voltage phase reference demand component, generates pole control signals for the three-level pole circuits using logic circuitry which combines phase indexed digital waveform values stored in a pair of lookup tables. The pole control signals force the three-level pole circuits to generate a set of phase-shifted waveforms with zero voltage components. The phase-shifted waveforms are combined by a set of transformers to produce a three-phase output voltage with a harmonic content lower than the harmonic content of the phase-shifted waveforms.

9 Claims, 7 Drawing Sheets

PHASE ANGLE

THREE-PHASE DC-TO-AC POWER INVERTER WITH THREE-LEVEL POLES

BACKGROUND OF THE INVENTION

1 Field of the Invention

This invention relates generally to devices to control power distribution. More particularly, this invention relates to a three-phase, dc-to-ac power inverter that utilizes three-level pole valves to produce waveforms with zero voltage components.

2 Background Information

Three-phase, dc-to-ac power inverters are used in electric power distribution systems. These devices have a set of switches that are used to convert a dc voltage signal into discreetly displaced square waveforms. The waveforms are subsequently combined to produce a high quality sinusoidal output signal.

FIG. 1 illustrates a prior art three-phase, dc-to-ac power inverter 20. The inverter 20 includes a first inverter stage 22 and a second inverter stage 24 connected by a dc source 26. Each inverter stage includes twelve two-level inverter poles 28.

FIG. 2a is an enlarged view of a two-level inverter pole 28. Each two-level inverter pole 28 includes a positive polarity thyristor 30 and an anti-parallel diode 32. When the positive polarity thyristor 30 is fired (closed), a positive dc waveform is produced at the output node (Vout). Each two-level inverter pole 28 also includes a negative polarity thyristor 34 and an anti-parallel diode 36. When the negative polarity thyristor 34 is fired, a negative dc waveform is produced at the output node. FIG. 2b illustrates a two-level square wave 38 produced by the two-level inverter pole 28. The term "two-level" is used in reference to the signal because the signal either has a positive value (V/2) or a negative value (−V/2).

Returning now to FIG. 1, it can be appreciated that the different two-level inverter poles 28 are used to generate a set of square waveforms. The waveforms are then combined by a set of interphase transformers 40. In addition to combining waveforms, the interphase transformers 40 serve to remove harmonic components associated with the input waveforms. The outputs of the interphase transformers are combined at a harmonic blocking transformer 42. The output from the harmonic block transformer 42 is applied to a main transformer 44, which includes primary delta windings 45, primary wye windings 46, and secondary delta windings 48. The three-phase output of the main transformer 44 is then applied to a load 50 which may be an electric power transmission line in the case of a utility application.

FIG. 3 illustrates a single phase, forty-eight pulse waveform generated by the apparatus of 20 of FIG. 1. Each pulsed signal is generated by a two-level inverter pole 28. By phase-shifting the signals generated at the two-level inverter poles 28 and then combining the phase-shifted signals with the transformers 40, 42 and 44, the waveform of FIG. 3 is produced. The output of the main transformer 44 includes the signal of FIG. 3 along with two identical signals which are phase-shifted 120° from one another.

In many existing applications, it is sufficient for an inverter to have limited control capability. For example, limited control capability is sufficient in static condensers (STATCONs). A static condenser is a power circuit that is connected in shunt with the power line to draw a controlled reactive current, thereby regulating the voltage at the point of connection and increasing the achievable power transmission. In existing static condensers, the inverter is controlled entirely by varying the phase angle of the inverter output voltage. There is no direct control of the ratio between the dc input voltage and the ac output voltage. Accordingly, the inverter cannot, for example, be controlled to produce a desired mix of positive and negative sequence voltages at its terminals. In addition, the dc input voltage cannot be maintained at a substantially constant level while varying the ac output voltage.

New applications are emerging where it is important for an inverter to quickly generate an arbitrary output voltage vector. That is, it is important for the inverter to quickly generate arbitrary magnitude and phase voltage quantities.

An example of the need for arbitrary inverter output voltage vector control is the unified power flow controller described in U.S. Pat. No. 5,343,139 (the '139 patent). The '139 patent, which is expressly incorporated by reference herein, describes an apparatus with an inverter serially connected (serial inverter) to a three-phase distribution network, an inverter connected in parallel (parallel inverter) to the three-phase distribution network, and a common dc source supplying each inverter. The dc voltage is held substantially constant by the parallel inverter, but the series inverter must produce widely varying ac voltage. In this case, a fast vector-controlled inverter makes it possible to implement active feedback control of the transmission line power which would not otherwise be possible. Another demanding application for a fast-acting vector-controlled inverter is flicker-reduction on power lines supplying electric arc furnaces.

Thus, it would be highly desirable to provide an improved three-phase, dc-to-ac power inverter. More particularly, it would be highly desirable to provide a three-phase, dc-to-ac power inverter that can rapidly generate arbitrary magnitude and phase output voltage values.

SUMMARY OF THE INVENTION

The invention is a three-phase, dc-to-ac power inverter with a dc voltage source and having a first dc node for positive voltage, a second dc node for negative voltage, and a third dc node for zero voltage. A set of three-level pole circuits are connected to the first dc node, the second dc node, and the third dc node of the dc voltage source. A control circuit, responsive to an inverter voltage vector reference demand signal with a voltage magnitude reference demand component and a voltage phase reference demand component, generates pole control signals for the three-level pole circuits to generate a set of phase-shifted waveforms with zero voltage components. The phase-shifted waveforms are combined by a set of transformers to produce a three-phase output voltage with a harmonic content lower than the harmonic content of the phase-shifted waveforms.

The invention provides a three-phase, dc-to-ac power inverter that can rapidly generate arbitrary magnitude and phase output voltage values. The invention can be readily incorporated into existing dc-to-ac power inverter circuit topologies and can exploit existing dc-to-ac power inverter control strategies. This is achieved while maintaining the same switching frequency as an inverter with two level poles.

BRIEF DESCRIPTION OF THE DRAWINGS

A full understanding of the invention can be gained from the following description of the preferred embodiments when read in conjunction with the accompanying drawings in which.

Like reference numerals refer to corresponding parts throughout the several views of the drawings.

DETAILED DESCRIPTION OF THE INVENTION

Figure 4A:
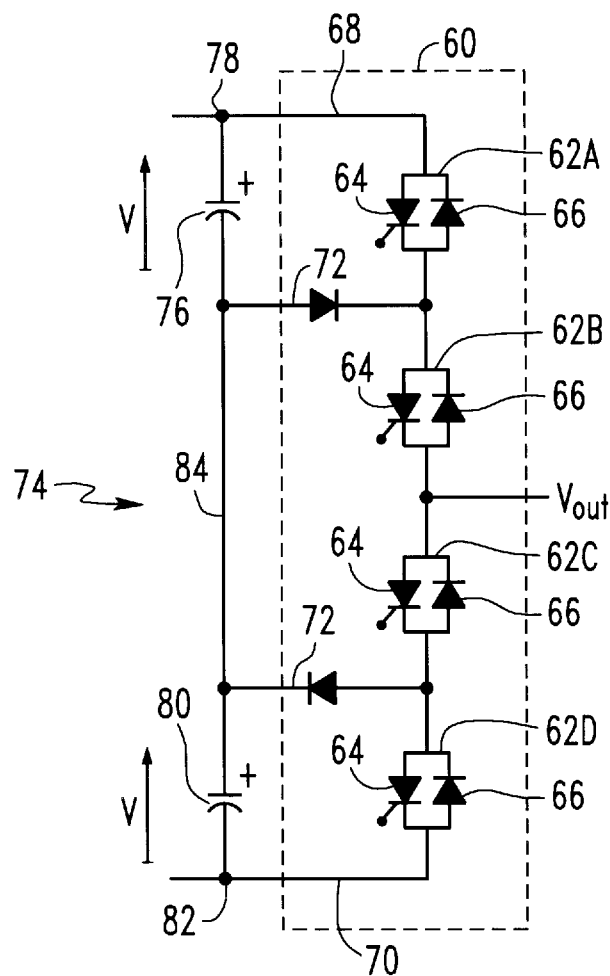
FIG. 4a illustrates a three-level inverter pole.

FIG. 4a illustrates a three-level pole circuit 60 in accordance with the invention. The three-level pole circuit 60 includes a set of serially connected electronic valves 62A, 62B, 62C, and 62D. Each electronic valve 62 includes a thyristor 64 and an anti-parallel diode 66.

The three-level pole circuit 60 includes a first dc node 68 that supplies a positive voltage to the circuit, a second dc node 70 that supplies a negative voltage to the circuit, and a third dc node 72 that delivers a zero voltage to the circuit.

The three-level pole circuit 60 is connected to a dc voltage source 74 which includes a first dc voltage source 76 with a positive node 78, and a second dc voltage source 80 with a negative node 82. The split dc-side capacitive voltage source 74 results in a neutral node 84, since the negative node of the first dc voltage source 76 is connected to the positive node of the second dc voltage source 80. The positive, negative and neutral nodes, 78, 82 and 84 of the voltage source 74 are connected to the positive, negative and zero voltage nodes, respectively, of the three-level pole circuit 60.

Figure 4B:
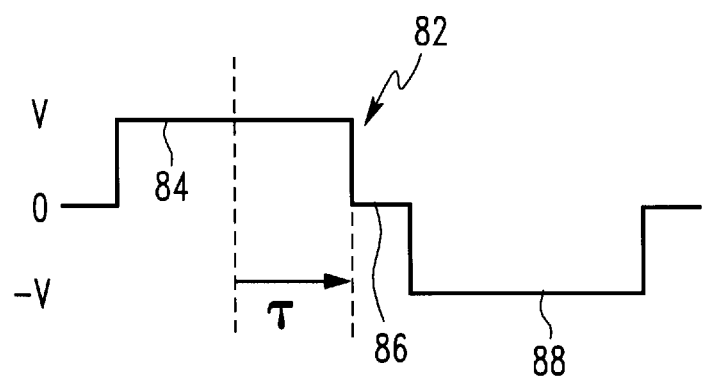
FIG. 4b shows its corresponding output waveform.

FIG. 4b illustrates the waveform 82 generated by the three-level pole circuit 60 of FIG. 4a. The waveform 82 includes a positive voltage component 84 that is generated when the electronic valves 62A and 62B are fired (closed), such that the output node (Vout) is connected to the positive voltage node 78. The waveform 82 also includes a zero voltage component 86 that is generated when the electronic valves 62B and 62C are fired, such that the output node is connected to the neutral voltage node 82.

Figure 5:
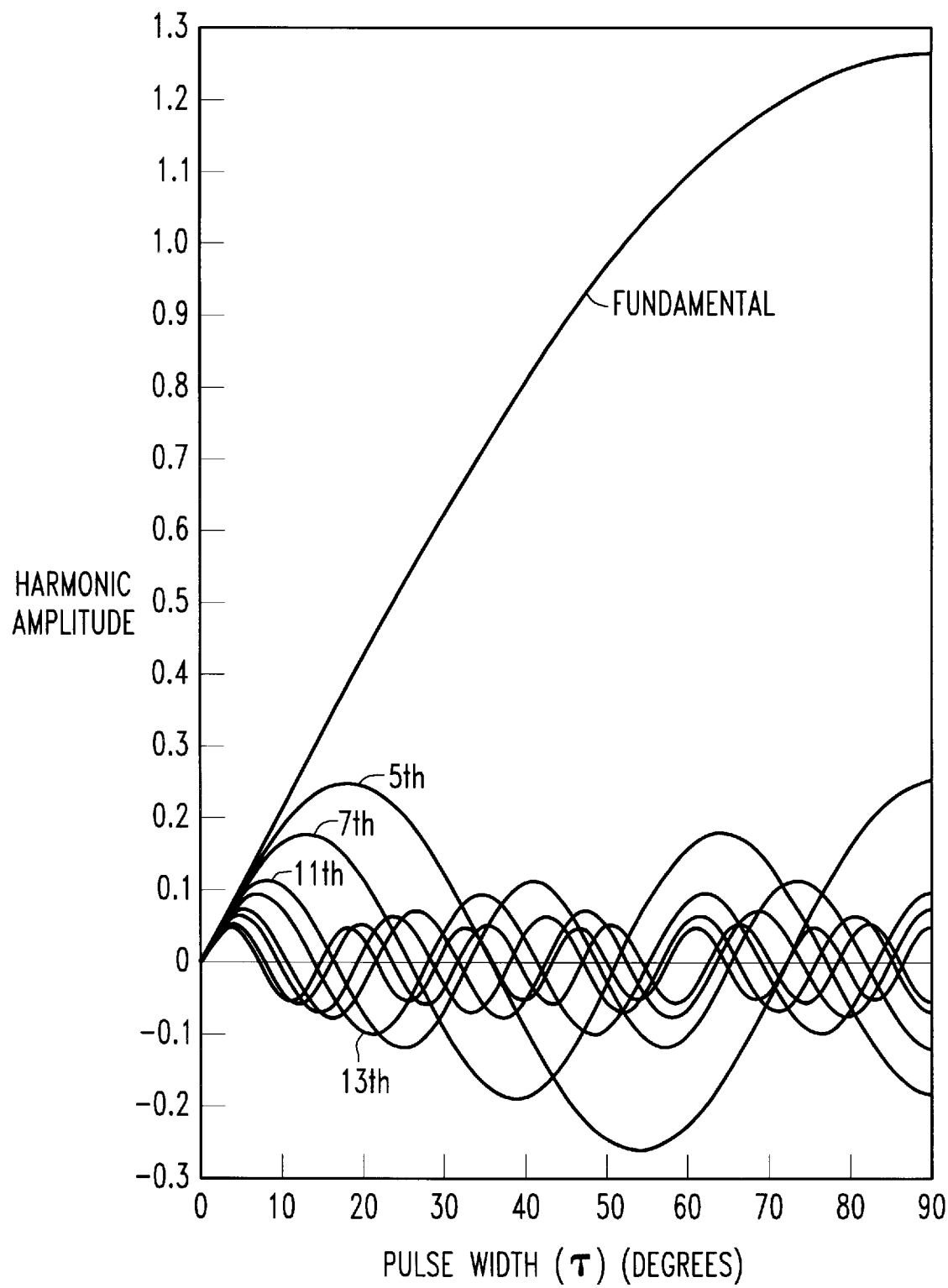
FIG. 5 illustrates the spectral components of the three-level inverter pole of FIG. 4.

In accordance with the invention, the duration of the zero voltage component 86 is varied as a function of the value τ. FIG. 5 illustrates the spectral components (excluding triplens) of the three-level pole output voltage as a function of τ. Note that as τ goes from 0 to 90 degrees, the fundamental output voltage amplitude increases monotonically (although not linearly) from 0 to a maximum value (0.637 * Vdc). Thus, it is possible to control the fundamental output voltage of the three-level pole circuit 60 by controlling the time of dwell at the zero voltage level as the pole transitions between its positive voltage state and its negative voltage state.

Figure 6:
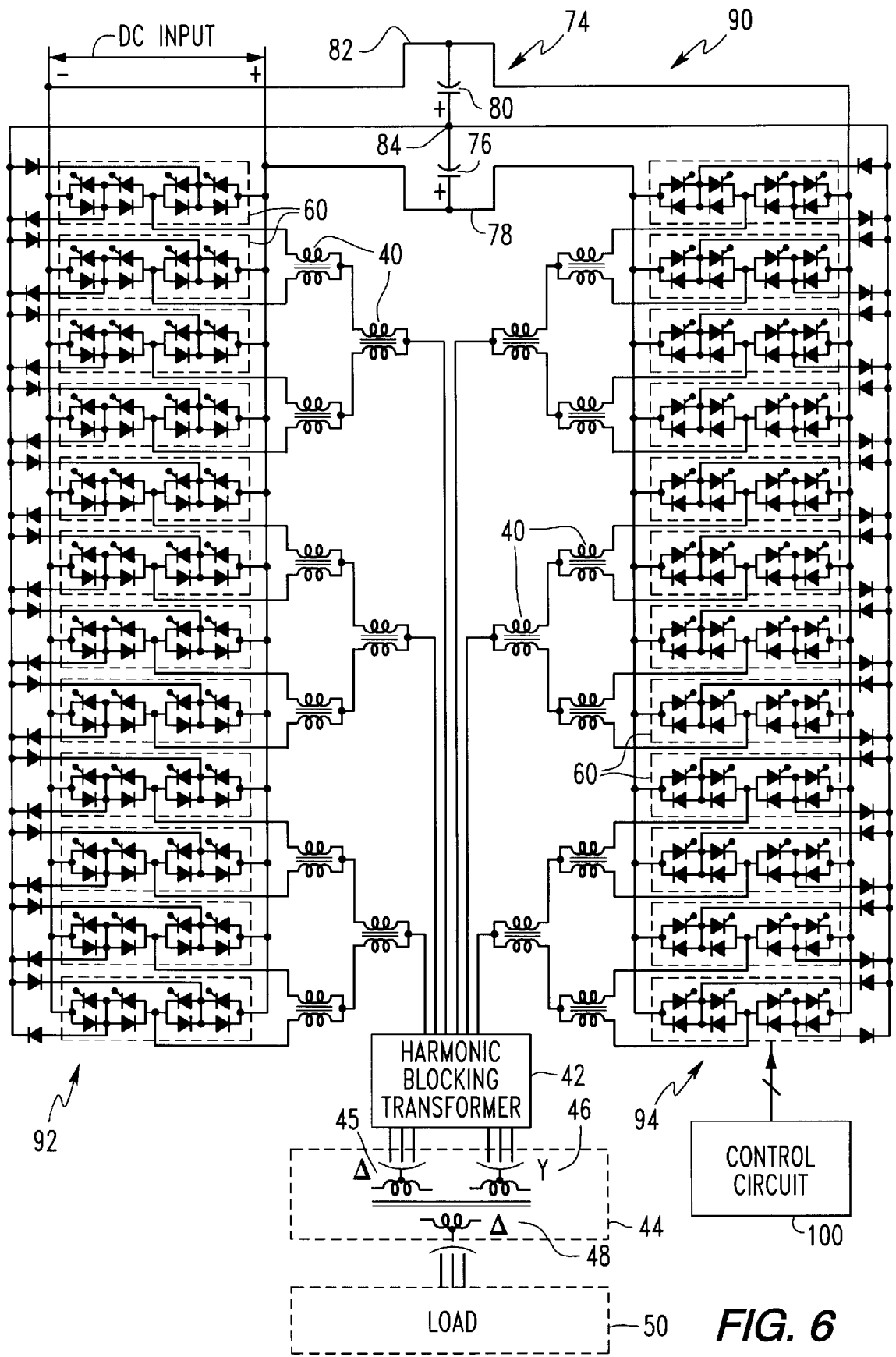
FIG. 6 illustrates a three-level pole, dc-to-ac power inverter in accordance with one embodiment of the invention.

FIG. 6 illustrates a three-level pole inverter 90 in accordance with the invention. The inverter 90 corresponds to the inverter of FIG. 1, but instead of the two-level poles 28 shown in FIG. 1, the three-level poles 60 of the invention are utilized. Thus, the circuit 90 includes a first inverter stage 92 and a second inverter stage 94, each of which is constructed with a set of three-level pole circuits 60.

The circuit 90 also includes a dc voltage source 74 in accordance with the invention. Specifically, the dc voltage source 74 includes a first dc voltage source 76 with a positive node 78, a second dc power source 80 with a negative node 82, and a neutral node 84.

Figure 1:
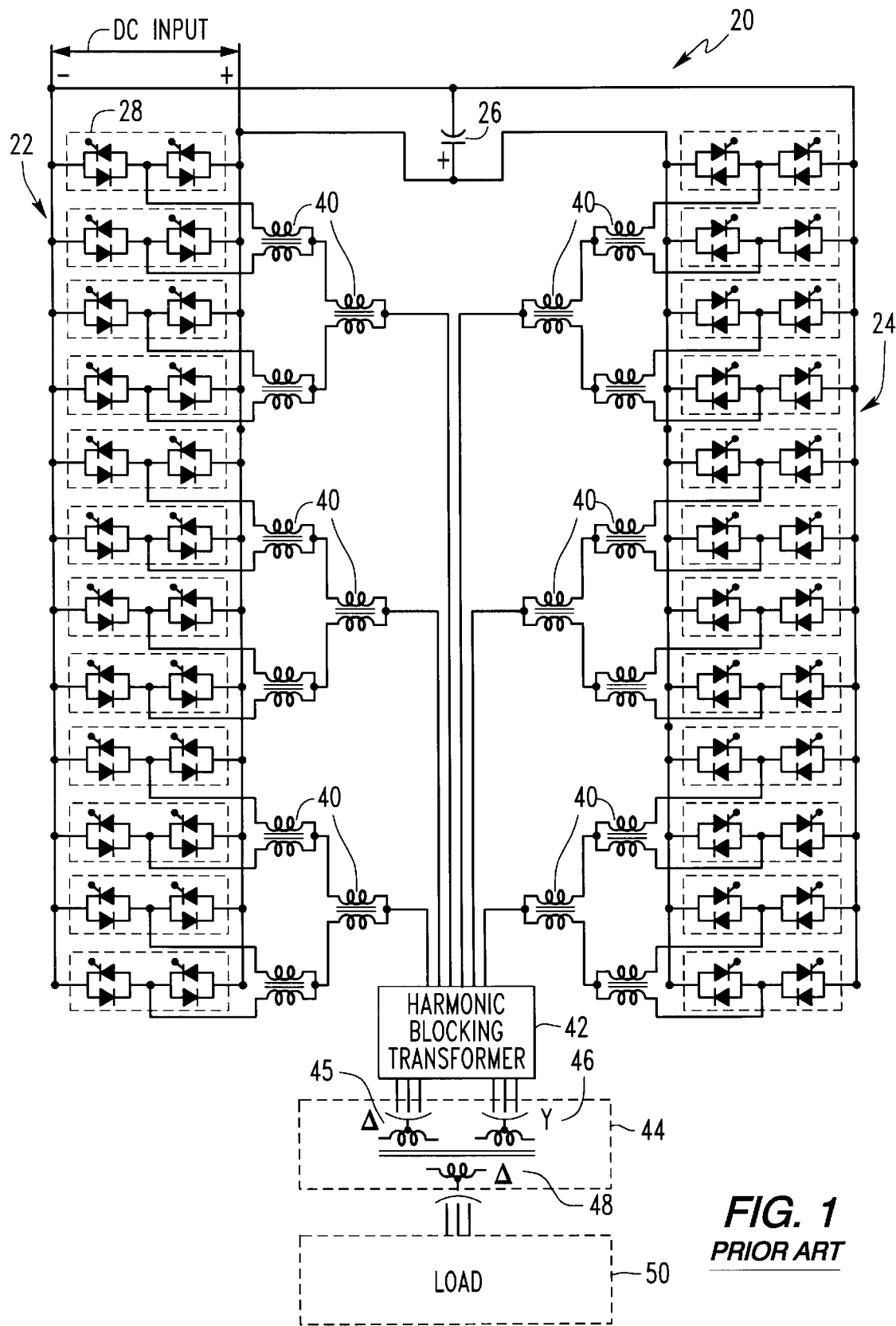
FIG. 1 illustrates a prior art two-level pole, dc-to-ac power inverter.
Figure 2A:
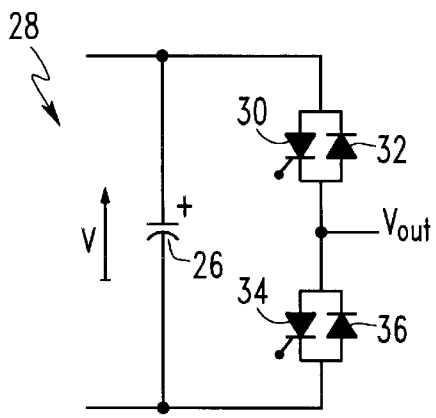
FIG. 2a is an enlarged view of a two-level pole.
Figure 2B:
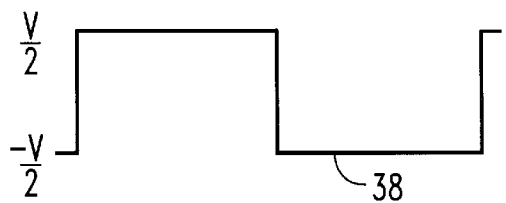
FIG. 2b illustrates its resultant output waveform.
Figure 3:
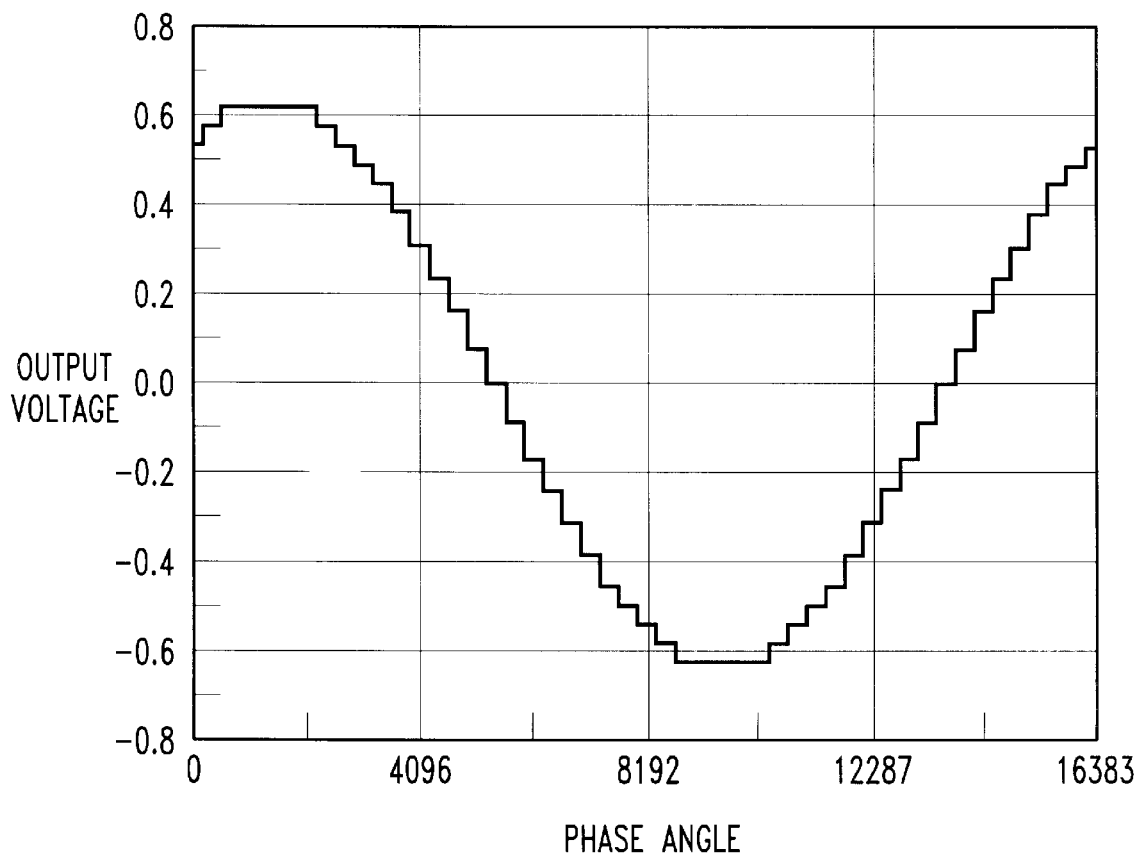
FIG. 3 illustrates an output waveform generated by the apparatus of FIG. 1.

The circuit 90 incorporates a transformer array consistent with the array shown in FIG. 1. In particular, the circuit 90 includes interphase transformers 40, a harmonic blocking transformer 42, and a main transformer 44, supplying a load 50.

Figure 7:
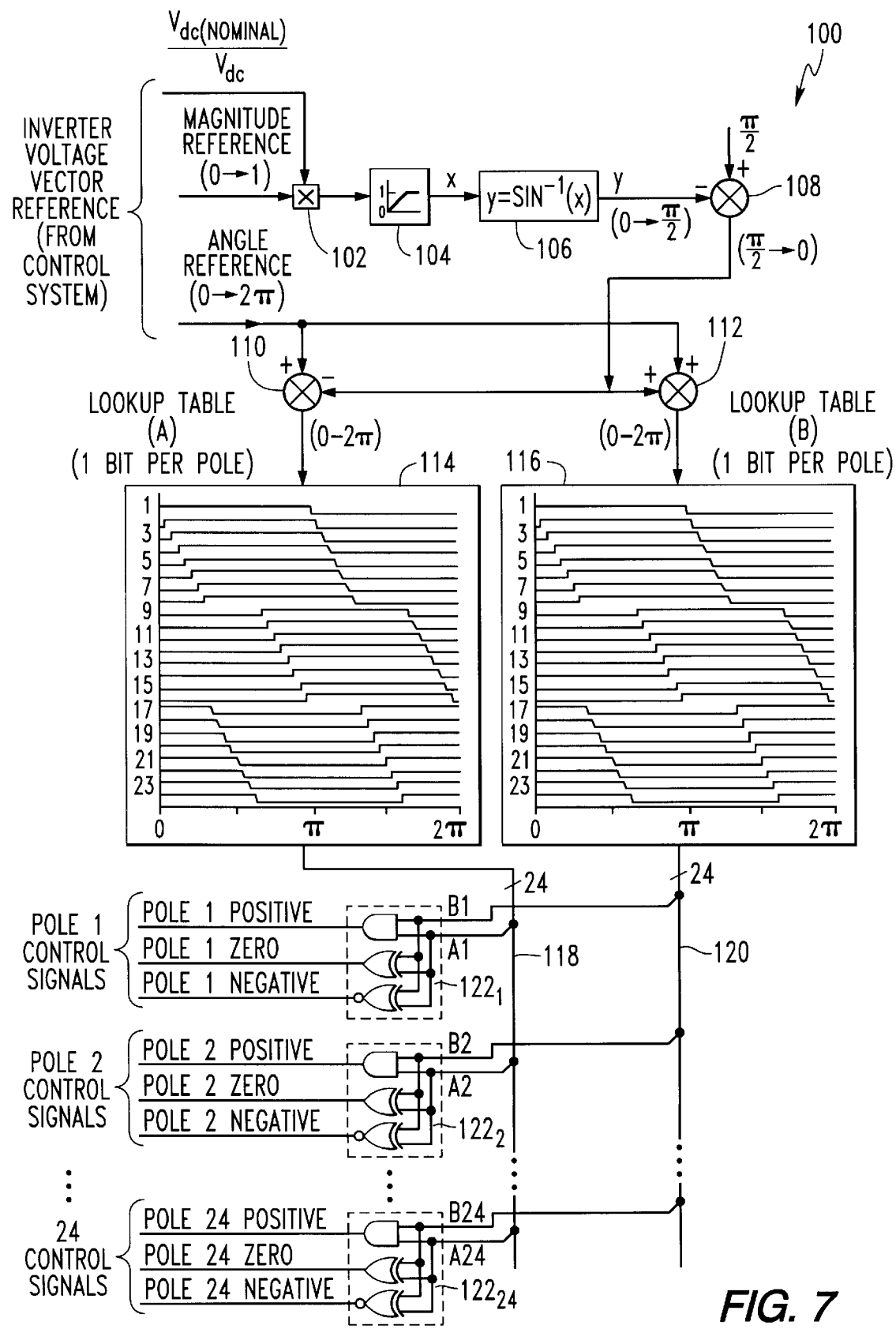
FIG. 7 illustrates a control circuit to generate pole control signals in accordance with an embodiment of the invention.

FIG. 6 includes a control circuit 100 that is used to fire the gates of the thyristors of the three-level pole circuits 60. FIG. 7 illustrates a control circuit 100 that may be used in accordance with the invention. The control circuit 100 is controlled by an inverter voltage vector reference demand signal. The inverter voltage vector reference demand signal includes a voltage magnitude reference demand component and a voltage phase reference demand component. The voltage magnitude reference demand component is multiplied, at multiplier 102, by the ratio of the nominal dc voltage to the measured dc voltage. The latter adjusts for variations of the dc input voltage. Standard sensors are used to measure the dc input voltage.

The output of the multiplier 102 is applied to a proportional control device 104. The output of the proportional control device 104 is converted to a radian value by a radian converter 106. The resultant radian value is between 0 and π/2, and the adder 108 is used to convert this range from π/2 to 0. The resultant value is subtracted from the voltage phase reference demand component at adder 110 and added to the voltage phase reference demand component at adder 112.

The output of adder 110 is a first radian value which is used to index a value in a first look-up table 114. The look-up table 114 stores a set of waveforms with values ranging from 0 to 2π. The set of waveforms corresponds to the number of poles in the inverter. Thus, relying upon the inverter 90 of FIG. 6, 24 waveforms exist in the look-up table 114. For each of the 24 waveforms, the first radian value is used as an index to a digital output value. For example, for the first waveform of the look-up table 114, if the first radian value is zero, then a digital output of one is generated. On the other hand, if the first radian value is 2π, then a digital output of zero is generated.

Again, relying upon the example of FIG. 7, the first radian value generates a set of 24 digital output values that are applied to a first output bus 118. The second radian value indexes a second look-up table 116 in an identical manner to generate 24 digital output values that are applied to a second output bus 120.

Each three-level pole circuit 60 has a corresponding digital logic circuit 122, as shown in FIG. 7. Each digital logic circuit 122 combines a digital output value from the first look-up table 114 and a digital output value from the second look-up table 116. In particular, each digital logic circuit 122 combines the digital output values associated with its entry in the look-up table. Each digital logic circuit 122 combines the digital output values so as to generate an appropriate set of firing commands for its corresponding three-level pole circuit 60. That is, each digital logic circuit 122 combines the digital output values so as to generate a pole control signal. The pole control signal forces the three-level pole circuit 60 to connect the output node (Vout) to the positive node 78, the negative node 82, or the neutral node 84. A sequence of pole control signals is used to form the waveform shown in FIG. 4.

Figure 8:
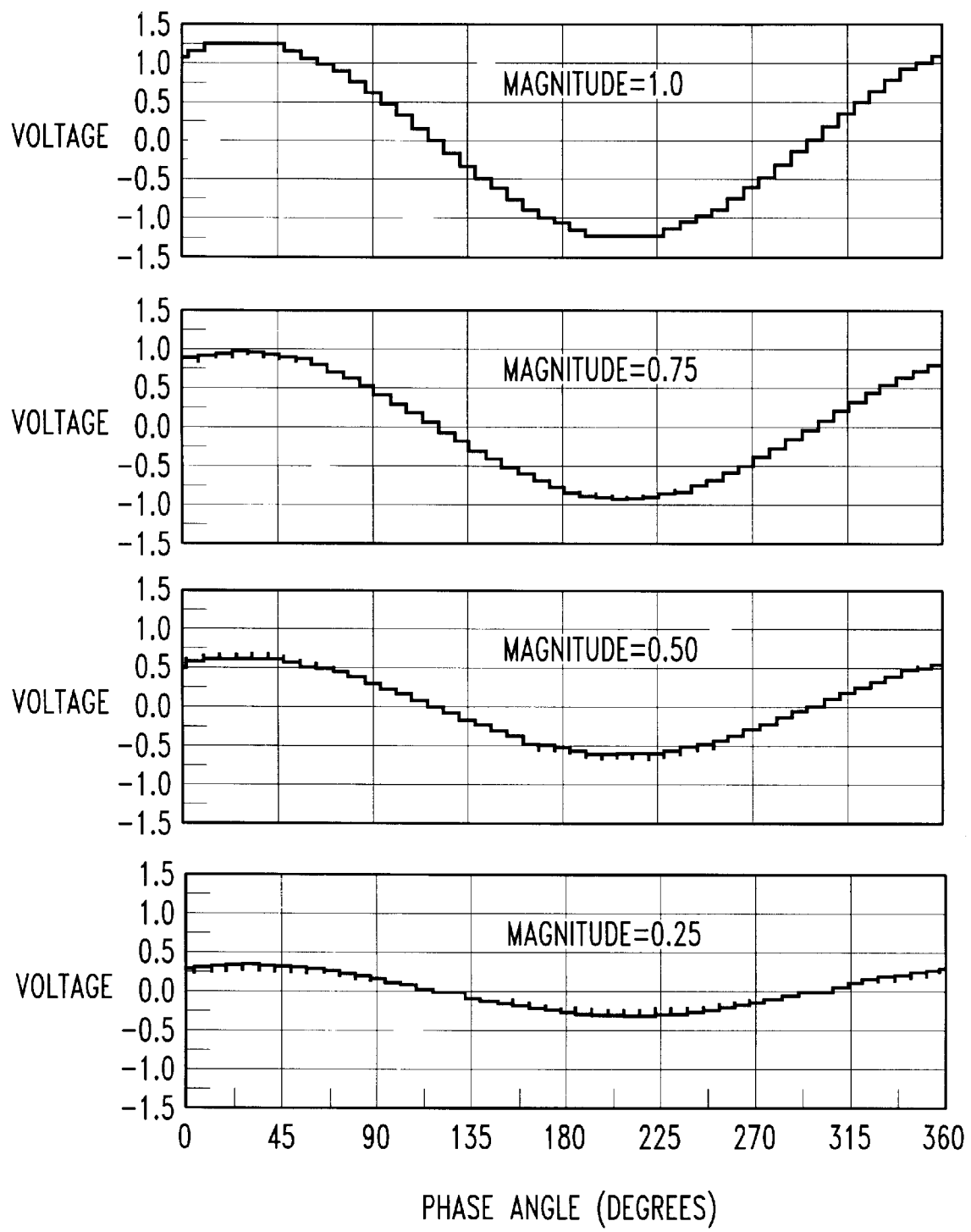
FIG. 8 illustrates inverter output voltage waveforms with different magnitude values formed in accordance with the apparatus of FIG. 6.

FIG. 8 illustrates the output voltage of inverter 90 for various vector magnitude reference values. Notice that the absolute level of residual harmonics in the output voltage is never worse than for the inverter of FIG. 1. This can be deduced by observing in FIG. 5 that the harmonic amplitudes are at a maximum value for τ=90 degrees. The relative size of the harmonics increases as the fundamental is reduced towards zero.

Those skilled in the art will recognize a number of benefits associated with the present invention. First, the invention utilizes a novel three-level pole circuit to rapidly generate arbitrary magnitude and phase inverter output voltage values. Advantageously, the invention is readily incorporated into existing dc-to-ac power inverter circuit topologies and can exploit existing dc-to-ac power inverter control strategies.

The foregoing descriptions of specific embodiments of the present invention are presented for purposes of illustration and description. They are not intended to be exhaustive or to limit the invention to the precise forms disclosed. Obviously, many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

What is claimed is:

1. Apparatus for converting a dc voltage to a three-phase ac voltage controlled in magnitude and phase for use in an electric power system, said apparatus comprising:

a dc voltage source having a positive voltage node, a negative voltage node, and a zero voltage node;

a plurality of three-level poles each connected to said positive voltage node, said negative voltage node and said zero voltage node, and each connected to an associated ac output terminal and being responsive to pole control signals to selectively connect said associated ac output terminal to one of said positive, negative and zero voltage nodes;

means connected to said ac output terminal of each of said plurality of three-level poles to generate a harmonic neutralized three-phase ac output voltage; and vector control means generating said pole control signals to produce said three-phase harmonic neutralized ac output voltage with a selected magnitude and phase angle.

2. The apparatus of claim 1 wherein said vector control means comprises means generating said pole control signals to adjust a dwell time during which each of said plurality of three-level poles connects said zero voltage node to said associated ac terminal in order to adjust said magnitude and phase angle of said three-phase harmonic neutralized ac output voltage.

3. The apparatus of claim 2 wherein said means generating said pole control signals comprises a first lookup table and a second lookup table each storing for each of said pluralities of poles phase indexed digital waveform values; means responsive to a voltage vector reference demand signal to address a phase indexed digital value in each of said first lookup table and second lookup table associated with each of said plurality of poles; and digital logic means for each pole responsive to the addressed digital values associated with the pole from said first lookup table and said second lookup table for generating said pole control signals.

4. The apparatus of claim 3 wherein said voltage vector reference demand signal has a voltage magnitude reference demand component and a voltage phase reference demand component and wherein said means responsive to said voltage vector reference demand signal comprises means combining said voltage magnitude reference demand component and said voltage phase reference demand component to generate a first lookup signal for addressing said phase indexed digital value in said first lookup table for each of said plurality of poles and a second lookup signal for addressing the phase index digital value in said second lookup table for each of said plurality of poles.

5. The apparatus of claim 4 wherein said combining means includes means adding a signal derived from said voltage magnitude reference demand component to said voltage phase reference demand component to generate said first lookup signal and means subtracting the signal derived from the voltage magnitude reference demand component from the voltage phase reference demand component to generate said second lookup signal.

6. The apparatus of claim 5 wherein said digital logic means comprises means generating for each pole, pole control signals including a positive pole control signal having a first digital value when the digital values from both said first lookup table and said second lookup table have a first same digital value, a negative pole control signal having said first digital value when the digital values from both said first lookup table and said second lookup table have a second same digital value, and a zero pole control signal when said digital values from said first lookup table and said second lookup table are different.

7. The apparatus of claim 5 wherein said combining means further includes means adjusting said signal derived from said voltage magnitude reference demand component for variations in voltage of said dc source.

8. The apparatus of claim 7 wherein said digital logic means comprises means generating for each pole, pole control signals including a positive pole control signal having a first digital value when the digital values from both said first lookup table and said second lookup table have a first same digital value, a negative pole control signal having said first digital value when the digital values from both said first lookup table and said second lookup table have a second same digital value, and a zero pole control signal when said digital values from said first lookup table and said second lookup table are different.

9. The apparatus of claim 3 wherein said digital logic means comprises means generating for each pole, pole control signals including a positive pole control signal having a first digital value when the digital values from both said first lookup table and said second lookup table have a first same digital value, a negative pole control signal having said first digital value when the digital values from both said first lookup table and said second lookup table have a second same digital value, and a zero pole control signal when said digital values from said first lookup table and said second lookup table are different.

* * * * *